US012597712B2

(12) United States Patent
Tesson

(10) Patent No.: US 12,597,712 B2
(45) Date of Patent: Apr. 7, 2026

(54) TRANSMISSION LINE ARRANGEMENT FOR A PASSIVE COMPONENT

(71) Applicant: NXP B.V., Eindhoven (NL)

(72) Inventor: Olivier Tesson, Bretteville l'Orgueilleuse (FR)

(73) Assignee: NXP B.V., Eindhoven (NL)

( * ) Notice: Subject to any disclaimer, the term of this patent is extended or adjusted under 35 U.S.C. 154(b) by 83 days.

(21) Appl. No.: 18/596,695

(22) Filed: Mar. 6, 2024

(65) Prior Publication Data

US 2024/0305007 A1 Sep. 12, 2024

(30) Foreign Application Priority Data

Mar. 10, 2023 (EP) .................................... 23305330

(51) Int. Cl.
*H01Q 13/20* (2006.01)
*H01Q 21/06* (2006.01)

(52) U.S. Cl.
CPC ......... *H01Q 13/206* (2013.01); *H01Q 21/061* (2013.01)

(58) Field of Classification Search
CPC ..... H01Q 13/206; H01Q 21/061; H01P 5/227
See application file for complete search history.

(56) References Cited

U.S. PATENT DOCUMENTS 4,093,928 A 6/1978 Proctor
5,132,645 A * 7/1992 Mayer ..................... H01P 5/227 333/120
5,521,563 A 5/1996 Mazzochette
10,644,375 B1 * 5/2020 Chueh ..................... H01P 5/184
11,496,098 B2 * 11/2022 Wang ...................... H01P 3/081
2005/0052259 A1 * 3/2005 Okazaki .................... H01P 5/04 333/118
2006/0028295 A1 * 2/2006 Piernas ................... H01P 5/187 333/116

(Continued)

FOREIGN PATENT DOCUMENTS

CN 104702267 A 6/2015
CN 111525222 B * 10/2021 ................ H01P 5/18

(Continued)

OTHER PUBLICATIONS

M. Chirala and C. Nguyen, "Multilayer Design Techniques for Extremely Miniaturized CMOS Microwave and Millimeter-Wave Distributed Passive Circuits", IEEE Transactions on Microwave Theory and Techniques, vol. 54, No. 12, Dec. 2006 (Year: 2006).*

(Continued)

*Primary Examiner* — Seokjin Kim

(57) ABSTRACT

A passive component comprising a first port and a second port, wherein the first and second ports are provided on a first axis, a third port and a fourth port, wherein the third and fourth ports are provided on a second axis perpendicular to the first axis, and a transmission line arrangement comprising four transmission lines, wherein the first port and the second port are each coupled to both the third port and the fourth port by respective transmission lines of the transmission line arrangement, wherein each transmission line follows a meandering path and each transmission line has the same length, such that the transmission line arrangement is symmetrical about at least one axis of symmetry.

20 Claims, 7 Drawing Sheets

(56) References Cited

U.S. PATENT DOCUMENTS

| | | | | |
|---|---|---|---|---|
| 2011/0043299 | A1* | 2/2011 | Ding | H01P 5/227 333/116 |
| 2014/0154981 | A1* | 6/2014 | Nakatani | H01P 5/20 333/122 |
| 2015/0303548 | A1* | 10/2015 | Ding | H01P 5/04 333/117 |
| 2016/0172736 | A1* | 6/2016 | Hash | H01P 5/184 333/112 |
| 2018/0006353 | A1* | 1/2018 | Chueh | H01P 5/227 |
| 2022/0031172 | A1* | 2/2022 | He | H01Q 9/0428 |
| 2022/0368001 | A1* | 11/2022 | Chueh | H01P 5/227 |
| 2023/0062209 | A1* | 3/2023 | Chueh | H01P 5/184 |

FOREIGN PATENT DOCUMENTS

| | | | | | |
|---|---|---|---|---|---|
| DE | 3924426 | A1 | * | 3/1990 | H01P 5/225 |
| EP | 0671776 | A1 | | 9/1995 | |
| GB | 2527407 | A | * | 12/2015 | H01P 5/12 |
| JP | 2002151919 | A | * | 5/2002 | |
| KR | 101464930 | B1 | * | 11/2014 | H01P 5/227 |
| KR | 101633054 | B1 | * | 6/2016 | H01P 5/12 |
| KR | 20220128900 | A | * | 9/2022 | H01P 5/16 |
| WO | WO-2009081179 | A1 | * | 7/2009 | H01P 5/04 |

OTHER PUBLICATIONS

M. K. Chirala and B. A. Floyd, "Millimeter-wave Lange and ring hybrid couplers in a silicon technology for E-band applications," in IEEE MTT-S Int. Microw. Symp. Dig., San Francisco, CA, Jun. 11-16, 2006, pp. 1547-1550 (Year: 2006).*

Chirala Mohan K et al.: "Multilayer Design Techniques for Extremely Miniaturized CMOS Microwave and Millimeter-Wave Distributed Passive Circuits", IEEE Transactions on Microwave Theory and Techniques, vol. 54, No. 12, IEEE, Piscataway, NJ, USA, Dec. 1, 2006, pp. 4218-4224.

Chen et al: "Design of Novel Miniaturized Fractal-Shaped Branch-Line Couplers"; 2007 Asia-Pacific Microwave Conference; Date of Conference: Dec. 11-14, 2007; 3 pages.

Cai et al. : "Design of Ultra-Low-Power 60-GHz Direct-Conversion Receivers in 65-nm CMOS"; IEEE Transactions on Microwave Theory and Techniques; vol. 61, Issue: 9, Sep. 2013; pp. 3360-3372.

* cited by examiner

Fig. 1 – PRIOR ART

TRANSMISSION LINE ARRANGEMENT FOR A PASSIVE COMPONENT

CROSS-REFERENCE TO RELATED APPLICATIONS

This application claims priority under 35 U.S.C. § 119 to European patent application no. 23305330.5, filed 10 Mar. 2023, the contents of which are incorporated by reference herein.

FIELD

The present specification relates to a transmission line arrangement for a passive component, and to uses of such a passive component.

BACKGROUND

Passive components are often used in microelectronics. A passive component does not include any active circuitry and does not generate electrical power or require any electrical power to operate. A variety of types of passive component exist, such as hybrid couplers.

Millimeter wave devices usually comprise one or more transmission lines (or Tlines) to transmit signals.

SUMMARY

Aspects of the present disclosure are set out in the accompanying independent and dependent claims. Combinations of features from the dependent claims may be combined with features of the independent claims as appropriate and not merely as explicitly set out in the claims.

According to a first aspect of the present disclosure, there is provided a passive component comprising a first port and a second port, wherein the first and second ports are provided on a first axis, a third port and a fourth port, wherein the third and fourth ports are provided on a second axis perpendicular to the first axis, and a transmission line arrangement comprising four transmission lines. The first port and the second port are each coupled to both the third port and the fourth port by respective transmission lines of the transmission line arrangement. Each transmission line follows a meandering path and each transmission line has the same length, such that the transmission line arrangement is symmetrical about at least one axis of symmetry.

A first transmission line couples the first port to the third port. A second transmission line couples the first port to the fourth port. A third transmission line couples the second port to the third port. A fourth transmission line couples the second port to the fourth port.

Optionally, the term indirect path may be used interchangeably with the term meandering path.

Optionally, the meandering path may comprise at least two changes of direction, or at least two turns or turning points.

Optionally, the meandering path may comprise a plurality of turning points.

The at least one axis of symmetry may comprise at least one rotational axis of symmetry.

Optionally, each axis of symmetry may be a rotational axis of symmetry.

Optionally, the transmission line arrangement is symmetrical about a plurality of axes of symmetry.

Optionally, the transmission line arrangement is symmetrical about a first axis of symmetry and a second axis of symmetry. The first and second axes of symmetry may be perpendicular.

Optionally, the first and second axes of symmetry each extend at an angle of 45 degrees relative to both the first axis and the second axis. Thus, the first and second axes of symmetry may be diagonal axes of symmetry.

Optionally, the transmission line arrangement is symmetrical about the first axis and the second axis.

The transmission line arrangement may be symmetrical about the first axis, the second axis and at least the first and second axes of symmetry.

Optionally, the first and second axis define four quadrants and one transmission line of the transmission line arrangement is provided within each quadrant.

Optionally, the transmission lines provided in nearest neighbour quadrants have different widths (relative to each other).

Optionally, each transmission line in the transmission line arrangement may have the same width.

It will be appreciated that the width of the transmission line may vary along the length of the transmission line.

Optionally, each transmission line is compressed or folded within the respective quadrant.

Optionally, each transmission line has a length that is at least two times greater than a length of a direct path between the respective ports.

Optionally, each transmission line has a length that is around five times greater than a length of a direct path between the respective ports. For example, each transmission line may have a length that is around 5 times greater than a length of a direct path between the first port and the third port.

In some embodiments, each transmission line has a length that is between 2 to 7 times greater than a length of a direct path between the respective ports, wherein each transmission line has the same length.

Optionally, the transmission line arrangement may have a surface area that is between around 15% to 50% of a surface area that would be required if the transmission line arrangement comprised straight transmission lines (i.e. transmission lines that follow a straight path).

The meandering paths may be designed or configured to minimize the surface area of the transmission line arrangement.

Optionally, the transmission line arrangement is provided in a single plane.

The transmission line arrangement may be formed using any type of transmission line. In some embodiments, the transmission line arrangement may comprise coplanar strip lines, or microstrip lines.

The passive component may be formed by a metallisation stack. It will be appreciated that the passive component is not limited to an integrated circuit, but could be formed on other substrates.

Optionally, the passive component comprises a ground shield. The ground shield may be provided as a base layer. The ground shield may be a plain or patterned metal layer.

Optionally, the transmission line arrangement is provided on a top layer, a ground shield is provided as a bottom layer, and at least one intermediate layer is provided between the top layer and the bottom layer.

The at least one intermediate layer may be referred to as at least one dielectric layer. The at least one intermediate layer therefore separates or electrically isolates the transmission line arrangement from the ground shield.

Each intermediate layer may comprise one or more ground paths coupled to the ground shield. The ground paths may shield the transmission line arrangement from electrical noise and interference.

The at least one intermediate layer may comprise a plurality of vias.

Optionally, the top layer may comprise one or more ground paths spaced from the transmission line arrangement.

Optionally, the passive component comprises a first ground shield and a second ground shield. The transmission line arrangement may be provided between the first ground shield and the second ground shield.

Optionally, the passive component may be a hybrid coupler. The first port may be an input port, the second port may be a first output port, the third port may be a second output port and the fourth port may be an isolated port.

The hybrid coupler may be a branchline coupler.

According to a second aspect of the present disclosure, there is provided an integrated circuit comprising the passive component of any embodiment or example of the first aspect of this disclosure.

The integrated circuit may comprise at least one active component in addition to the passive component.

Optionally, the passive component comprises a ground shield and the at least one active component may be provided below the ground shield.

Optionally, the transmission line arrangement may be formed of the same metal as a top metal layer of the integrated circuit.

Optionally, the ground shield may be formed of a different metal compared to a bottom or lowest metal layer of the integrated circuit.

According to a third aspect of the present disclosure, there is provided a printed circuit board, PCB, comprising the passive component of any embodiment or example of the first aspect of this disclosure.

Thus, the passive component may form part of an integrated circuit, or it may be formed on a PCB.

According to a further aspect of the present disclosure, there is provided an amplifier comprising the passive component as defined above, wherein the transmission line arrangement is provided on a top layer, a ground shield is provided as a bottom layer, and at least one intermediate layer is provided between the top layer and the bottom layer, wherein the transmission lines form a bypass path, and at least one active component is provided below the ground shield.

It will be appreciated that there are a variety of different uses for the passive component of the present disclosure.

Some additional non-limiting uses are in an IQ modulator, a polyphase filter, or a Reflective Type Phase Shifter.

According to a further aspect of the present disclosure, there is provided a method of manufacturing a passive component, comprising providing a substrate, forming a first port and a second port on the substrate, wherein the first and second ports are provided on a first axis, forming a third port and a fourth port on the substrate, wherein the third and fourth ports are provided on a second axis perpendicular to the first axis, forming a transmission line arrangement on the substrate, the transmission line arrangement comprising four transmission lines, wherein the first port and the second port are each coupled to both the third port and the fourth port by respective transmission lines of the transmission line arrangement, wherein each transmission line follows a meandering path and each transmission line has the same length, such that the transmission line arrangement is symmetrical about at least one axis of symmetry.

The passive component may be formed as an integrated circuit, via any known manufacturing process.

Optionally, the transmission line arrangement is provided on a top layer, a ground shield is provided as a bottom layer, and at least one intermediate layer is provided between the top layer and the bottom layer.

The passive component may be formed on a PCB.

BRIEF DESCRIPTION OF THE DRAWINGS

Embodiments of this disclosure will be described hereinafter, by way of example only, with reference to the accompanying drawings in which like reference signs relate to like elements and in which.

DETAILED DESCRIPTION

Embodiments of this disclosure are described in the following with reference to the accompanying drawings.

Figure 1:
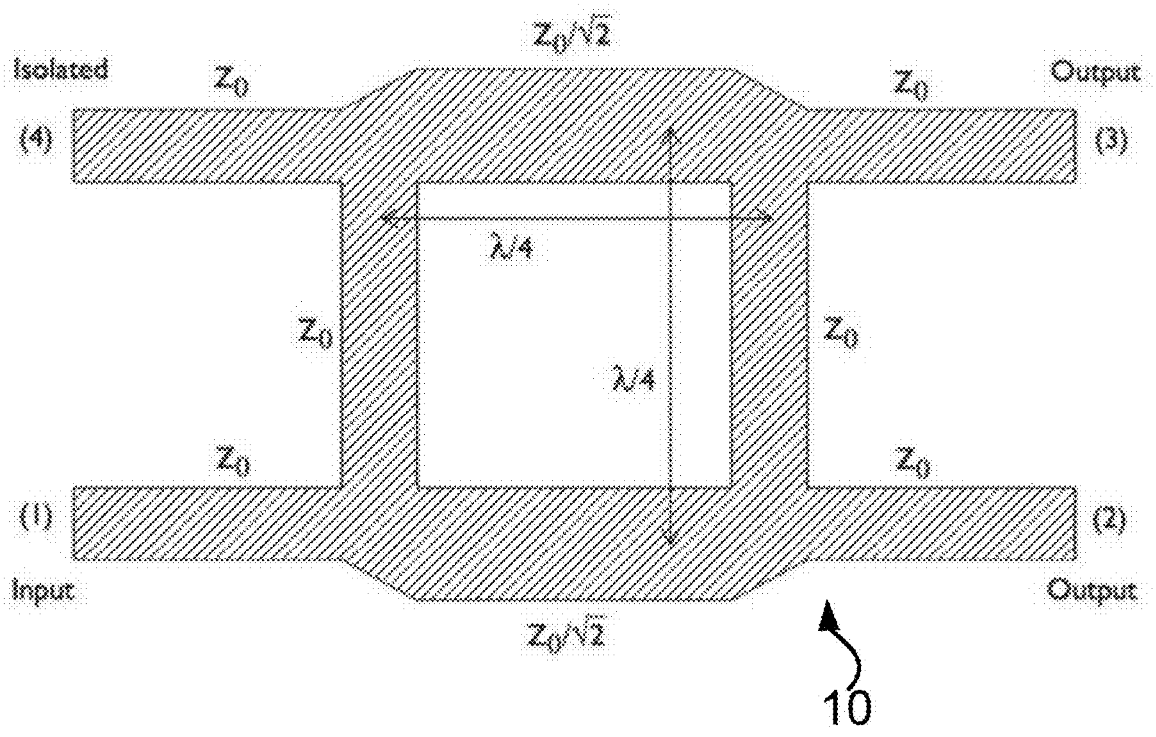
FIG. 1 shows a prior art example of a hybrid coupler.

FIG. 1 shows a prior art hybrid coupler 10. In this example, the hybrid coupler 10 is a branchline coupler, which is a type of quadrature coupler. The hybrid coupler 10 comprises an input port 1, a first output port 2, a second output port 3 and an isolated port 4. The isolated port 4 is coupled to ground. The ports are connected by transmission lines having a square or box arrangement.

In this example, each transmission line has a length of a quarter wavelength (based on the signal frequency used), but it will be appreciated that in other examples the transmission lines may have other lengths, such as a half wavelength, or three-quarters wavelength, etc, depending on the particular use of the hybrid coupler 10.

The input signal (port 1) is split into two quadrature output signals, at the first output port 2 and the second output port 3. In this example, each of the thinner transmission lines has an impedance of $Z_0$ and each of the wider transmission lines has an impedance of $Z_0/\sqrt{2}$, such that the signal at each output port 2, 3 has the same strength but a phase difference of 90 degrees. This type of hybrid coupler 10 is well known. However, it is not very efficient in terms of space used, which increases costs and can make it difficult to form the coupler as part of an integrated circuit due to the space required.

As such, there is a need for a more efficient transmission line arrangement for a passive component, such as a hybrid coupler, which reduces the amount of space used by the transmission lines without negatively affecting performance of the transmission line arrangement. In addition, there is the need for a passive component that is easily integrated as part of an integrated circuit.

Figure 2:
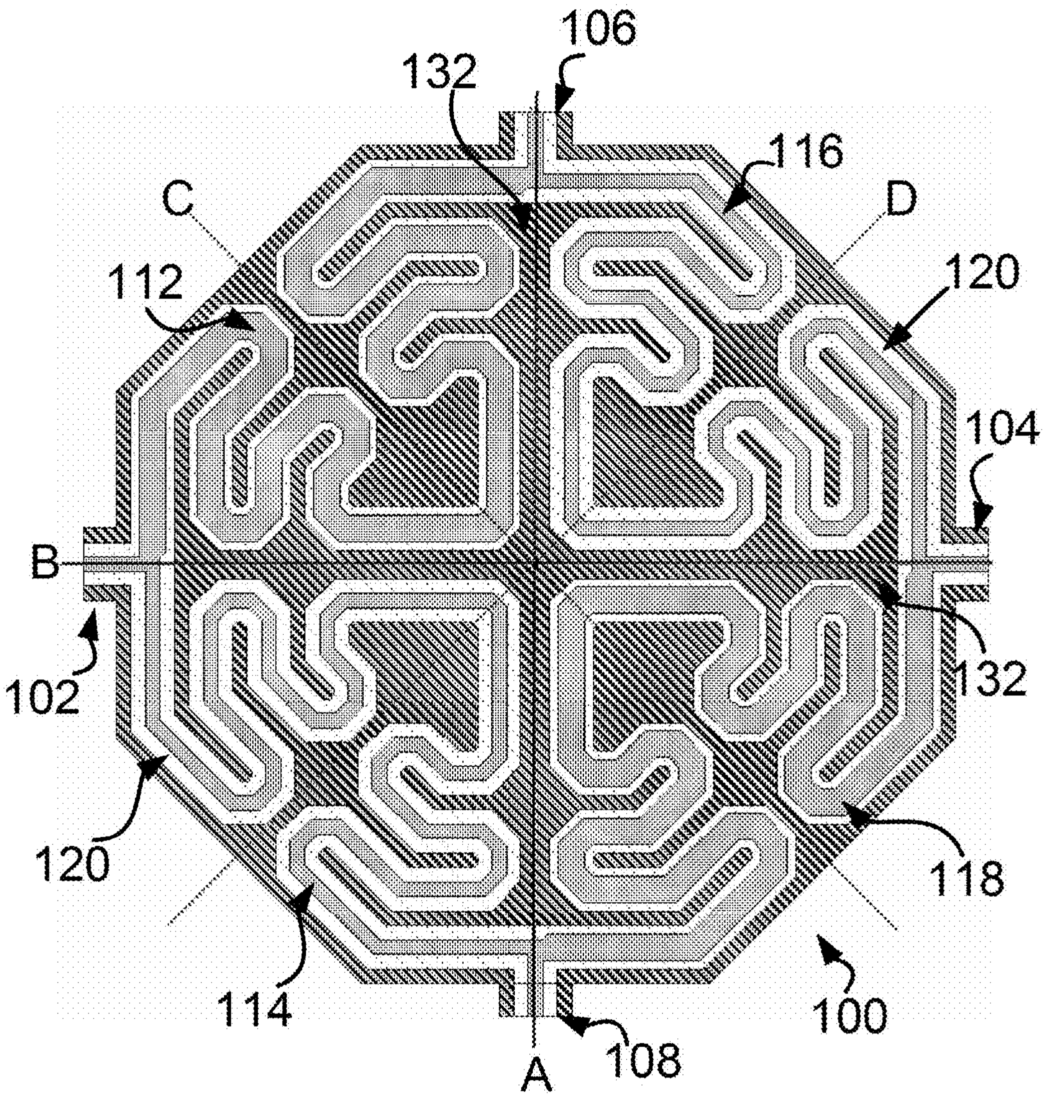
FIG. 2 shows a top plan view of a passive component according to an embodiment of this disclosure.

In FIG. 2, there is shown a top plan view of a passive component 100 according to an embodiment of the present disclosure. The passive component 100 may be a hybrid coupler, but it is not limited to this application, as discussed below.

The passive component 100 comprises a first port 102, a second port 104, a third port 106 and a fourth port 108. The first port 102 and the second port 104 are provided on a first axis A. The third port 106 and the fourth port 108 are provided on a second axis B. The first axis A and the second axis B are perpendicular to each other, or orthogonal, as shown in FIG. 2.

If the passive component 100 is formed as a hybrid coupler, the first port 102 can be considered to be the input port, the second port 104 can be considered to be the first output port, the third port 106 can be considered to be the second output port, and the fourth port 108 can be considered to be the isolated port.

The ports are connected by a transmission line arrangement 110 provided in a single plane. The transmission line arrangement 110 comprises four transmission lines. A first transmission line 112 couples the first port 102 to the third port 106. A second transmission line 114 couples the first port 102 to the fourth port 108. A third transmission line 116 couples the second port 104 to the third port 106. A fourth transmission line 118 couples the second port 104 to the fourth port 108.

Figure 4:
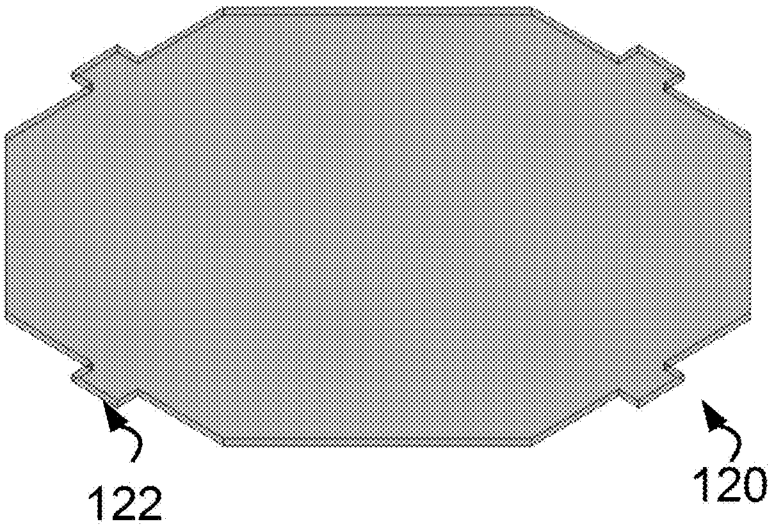
FIG. 4 shows the base ground shield of the passive component in FIG. 2.
Figure 5:
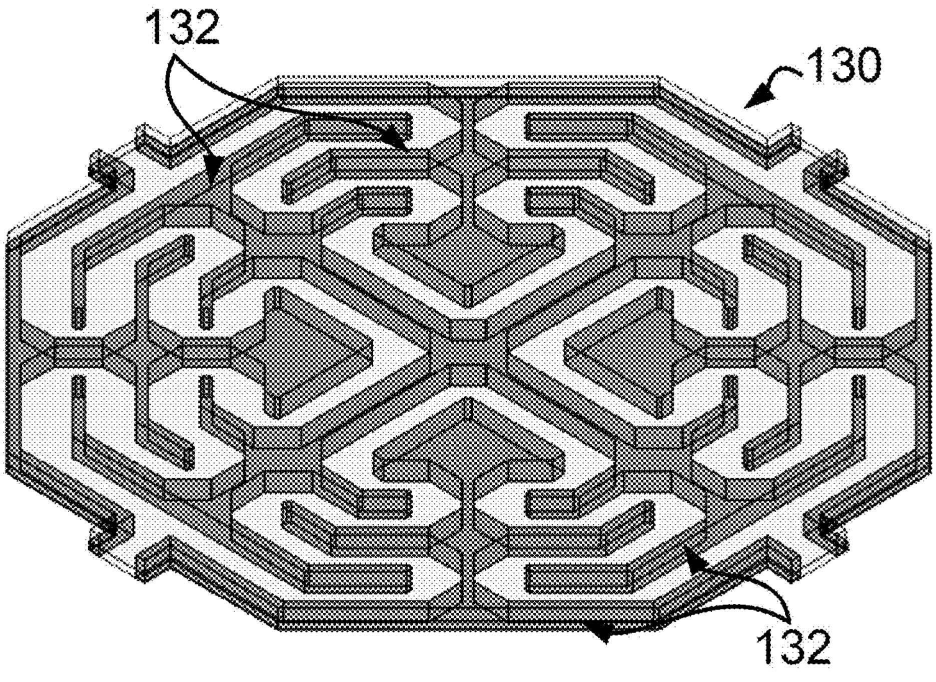
FIG. 5 shows an intermediate layer of the passive component in FIG. 2.
Figure 6:
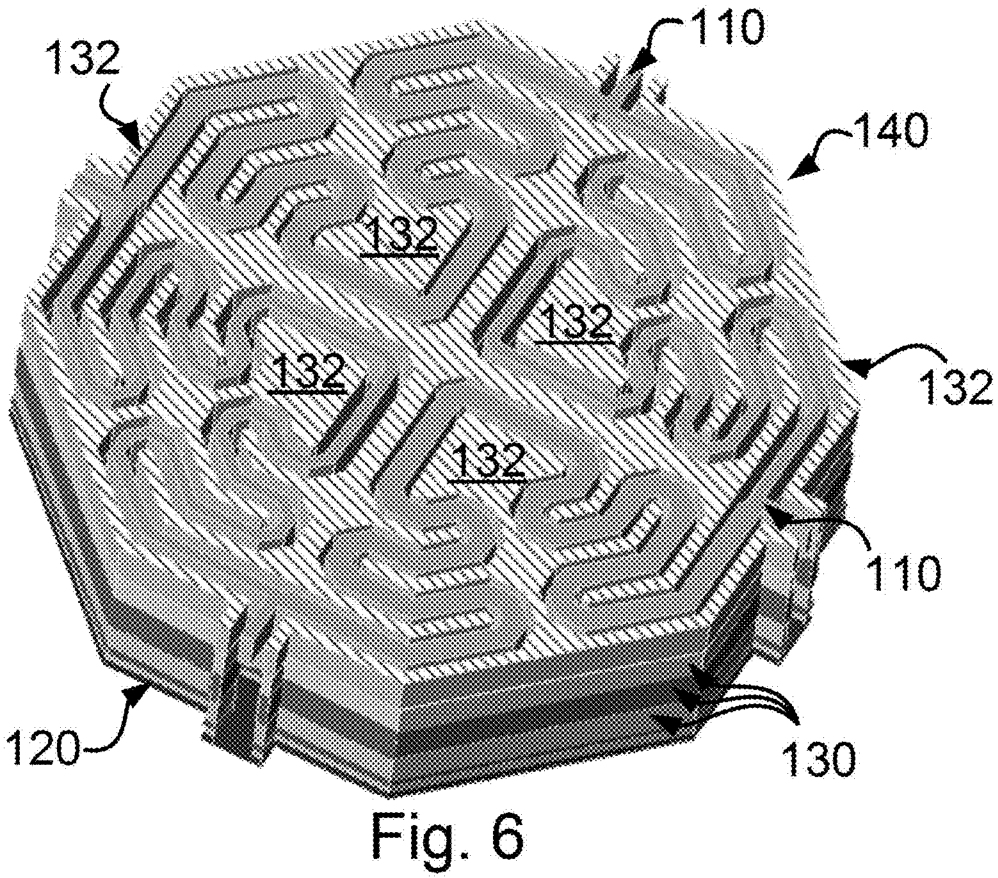
FIG. 6 shows a top perspective view of the fully assembled passive component in FIG. 2.

In this embodiment, the passive component 100 is formed of a metallization stack. A ground shield 120 is provided as the base layer of the passive component 100, this is visible in FIG. 2 as the white dotted area surrounding the transmission lines. A plurality of ground paths 132 are also provided. The ground paths 132 are spaced from (i.e. do not contact) the transmission line arrangement. The ground paths 132 may be at least partially provided on a different plane to the transmission line arrangement 110. As shown in FIGS. 4 to 6 and discussed below, the ground paths 122 can be built on top of the ground shield 120 on one or more intermediate layers 130 and/or on a top layer, wherein the transmission line arrangement 110 is provided on the top layer of the passive component 110.

Each transmission line 112, 114, 116, 118 has the same length. If the transmission lines are not the same length this will result in a phase unbalance between the ports and signal losses. The length of the transmission lines can be set according to the particular requirements or use of the passive component. In a non-limiting example, each transmission line may have a length equal to a quarter wavelength or a half wavelength of the signal. In some embodiments, the passive component 100 may be configured to be used with a signal frequency of 30 GHz.

Each transmission line 112, 114, 116, 118 in the transmission line arrangement 110 follows an indirect path between the respective two ports. This can be referred to as a meandering path. The meandering path may have at least two changes of direction. In the embodiment shown in FIG. 2, each meandering path has fifteen changes of direction. It will be appreciated that the meandering path is not limited to the particular path or shape shown in FIG. 2 or the other drawings.

The first and second axes A, B divide the transmission arrangement 110 into quadrants. It will be appreciated that there is no physical division between the quadrants, as the axes are a mathematical construct. One transmission line of the transmission line arrangement 110 is provided in each quadrant. The transmission line can therefore be considered to be folded, condensed or concertinaed within the quadrant. The meandering paths may be designed or configured to minimize the surface area taken up by the transmission line arrangement.

Accordingly, each transmission line follows a longer path than a direct path between the respective two ports. As such, the transmission line arrangement 110 takes up less space on the silicon or substrate than the prior art arrangement shown in FIG. 1, or other arrangements where the transmission lines follow direct or straight paths. Thus, a more compact transmission line arrangement is provided. In some embodiments, the passive component 100 can provide up to 80% reduction in surface area compared to classical passive components comprising straight transmission lines, such as the hybrid coupler in FIG. 1. Thus, the passive component 100 reduces manufacturing costs and size of the component, which is highly advantageous.

It is important for the transmission line arrangement 110 to have at least one axis of symmetry or rotational symmetry. If this requirement is not met, there will be phase unbalance and different amplitude signals at the output ports (e.g. ports 106, 104). In FIG. 2, the transmission line arrangement is symmetrical about the first axis of symmetry C and the second axis of symmetry D. These are diagonal axes of symmetry. Thus, the first C and second D axes of symmetry extend at an angle of 45 degrees relative to the first and second axis A, B.

Figure 3:
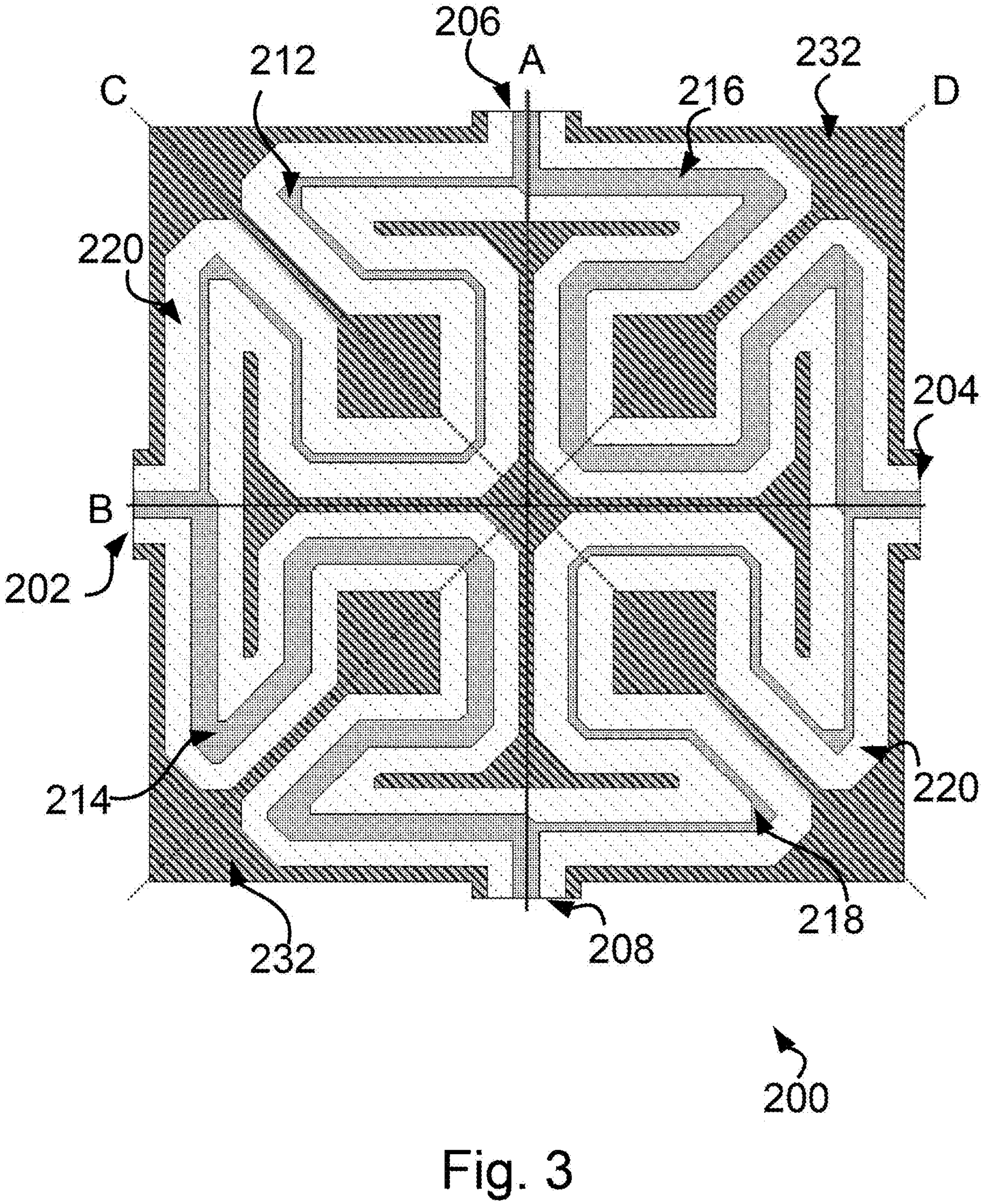
FIG. 3 shows a top plan view of a passive component according to another embodiment of this disclosure.

FIG. 3 shows a top plan view of another embodiment of a compact passive component 200 according to the present disclosure. Features which are common between the two embodiments have been numbered accordingly (the same reference number plus 100).

In FIG. 3 a metal ground shield 220 is the base layer of the passive component 200. A plurality of metallized ground paths 232 are provided on top of the ground shield 220, wherein the ground paths 232 can be formed of a plurality of layers stacked on top of each other. In this embodiment, a top layer of the ground paths 232 is coplanar with (in the same plane as) the transmission lines 212, 214, 216, 218. The ground paths 232 do not contact the transmission lines 212, 214, 216, 218.

In FIG. 3, each transmission line 212, 214, 216, 218 follows a meandering path having seven changes of direction. The route of the meandering path is different to (and less compressed compared to) the path in FIG. 2. In some embodiments, the passive component 200 may be configured to be used with a signal frequency of 100 GHz. The passive component 200 can provide up to 60% reduction in surface area compared to classical straight transmission line arrangements, such as the hybrid coupler in FIG. 1.

In FIGS. 2 and 3 the first 112, 212 and fourth 118, 218 transmission lines are shown to have a first width, and the second 114, 214 and third 116, 216 transmission lines are shown to have a second width, wherein the first width is greater than the second width. Thus, transmission lines in adjacent or nearest neighbour quadrants do not have the same width. This is to alter the impedance of the transmission lines, as described above and shown in connection with FIG. 1.

In other embodiments, the transmission lines in the arrangement may have the same width. In these embodiments, the transmission line arrangement may also be symmetrical (rotationally symmetrical) about the first axis A and the second axis B (see FIGS. 2 and 3).

The passive component 100, 200 may be formed on a PCB, or as part of an integrated circuit (IC). Thus, the passive component 100, 200 may be formed of a stack of layers, or a metallization stack, as shown in FIGS. 4 to 6 in relation to the passive component 100 in FIG. 2. It will be appreciated that the passive component 200 can be formed via the same process.

FIG. 4 shows the ground shield 120 which forms the base or bottom layer of the passive component 100. The ground shield 120 may be a plain metal layer, or a patterned metal layer. The ground shield 120 will act as the ground reference for the passive component 100. The ground shield 120 may boost the phase along the transmission line arrangement and thus further reduces the overall size of the component.

Active circuitry may be provided below the ground shield 120, so the ground shield 120 may protect the passive component 100 from interference caused by the active circuitry. The lowest metal layer of the component is used to form the connection to the component terminals. As such, the ground shield 120 should preferably not be made from the same metal as the lowest metal layer of the overall component, to avoid creating short circuits.

The square projections 122 are the shield extension for the ports of the passive component 100, to avoid any discontinuity of the signal. In other embodiments, the shield extensions 122 may have a different shape, or no projections may be provided. It will be appreciated that the ground shield 120 is not limited to the shape shown in FIG. 4. In the embodiment shown in FIG. 3, the ground shield 220 has a square or quadrilateral shape. The shape of the ground shield 120 can be selected dependent on the shape of the meandering paths of the transmission lines, and to minimize the area of the passive component 100.

In this embodiment, at least one intermediate layer 130 is provided on top of the ground shield 120. FIG. 5 shows an embodiment of an intermediate layer 130. The intermediate layer 130 electrically isolates or separates the transmission line arrangement 110 from the ground shield 120. The intermediate layer 130 includes a plurality of ground paths 132 that shield the transmission line arrangement 110 from electrical noise and interference. The ground paths 132 may also be used for impedance tuning and to dimension the characteristic impedance of the component 100. Each intermediate layer 130 is therefore a dielectric layer and may comprise one or more vias. It will be appreciated that a plurality of intermediate layers 130 may be provided, which build up the ground paths 132 across a plurality of layers, improving the shielding of the transmission line arrangement 110.

The transmission line arrangement 110 is formed on a top layer 140 of the passive component 100. Thus, the transmission line arrangement 110 can be formed on top of the final intermediate layer 130. FIG. 6 shows an embodiment of the passive component 100 when the top layer 140 has been applied or built. As shown, a plurality of ground paths 132, are also provided on the top layer 140 parallel to the transmission line arrangement 110, wherein the ground paths 132 are built on top of the ground paths 132 in the intermediate layers 130. In FIG. 6, the transmission lines extend from the middle signal line of each port, and the other lines are the ground paths 132. Thus, in FIG. 6 the transmission line arrangement is formed of coplanar strip lines. In other embodiments, the ground paths 132 on the top layer 140 may not be provided. Instead, the transmission line arrangement may be formed of microstrip transmission lines. It will be appreciated that any type of transmission line may be used in the passive component 100.

Figure 7:
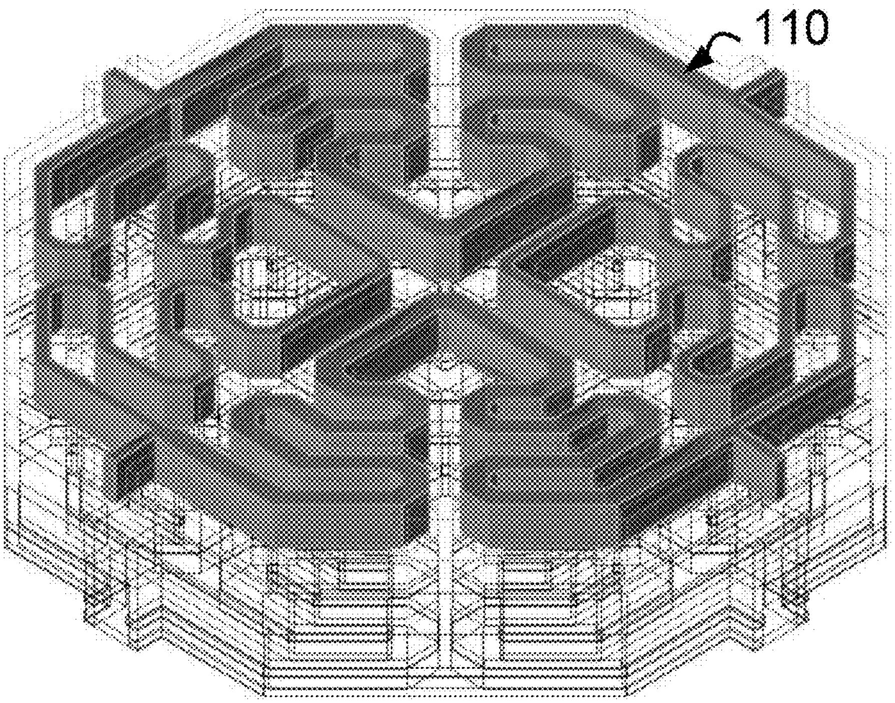
FIG. 7 shows only the transmission line arrangement from FIG. 6.

FIG. 7 shows the top layer 140 with the ground paths 132 removed, so just the transmission line arrangement 110 is clearly visible. The intermediate layers 130 and ground shield 120 are shown as outlines in FIG. 7 to indicate the depth of the passive component 100. It may be preferred for the transmission lines to be formed of the same metal as a top metal layer of the integrated circuit, as this can reduce losses.

In other embodiments (not shown), a first ground shield and a second ground shield may be provided. The transmission line arrangement 110 may be provided between the first ground shield and the second ground shield. Thus, a top ground shield may be provided in addition to a bottom ground shield. The transmission line arrangement 110 may be formed of strip line transmission lines.

Figure 8A:
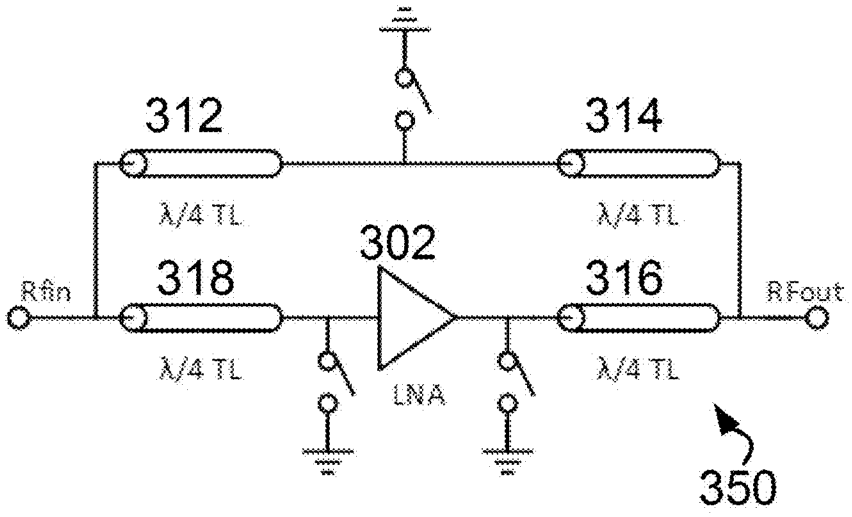
FIG. 8A shows an example circuit diagram of a bypass amplifier.
Figure 8B:
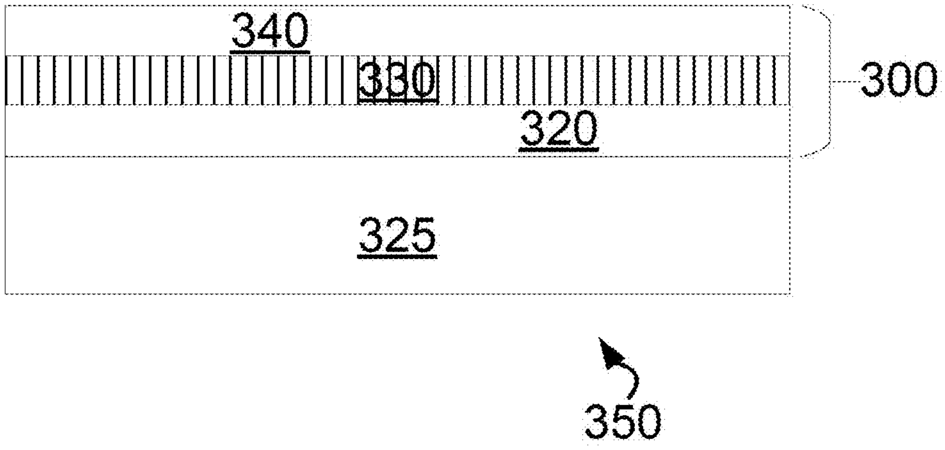
FIG. 8B is a schematic cross-sectional diagram showing how the bypass amplifier of FIG. 8A could be implemented according to an embodiment of this disclosure.

As mentioned above, the passive component of the present disclosure is not limited to hybrid couplers. FIG. 8A shows an example of a bypass amplifier 350 and FIG. 8B shows how the bypass amplifier 350 can be implemented using a passive component 300 according to an embodiment of the present disclosure. As shown in FIG. 8A, the bypass amplifier 350 comprises transmission lines 312, 314, 316, 318 and a low-noise amplifier (LNA) 302. The transmission lines 312, 314, 316, 318 can be provided by a transmission line arrangement according to the present disclosure. Thus, the transmission line arrangement can be formed as part of a passive component 300. In FIG. 8B, the transmission line arrangement is formed in/on a top layer 340 of the passive component 300 and at least one intermediate layer 330 may be provided. The passive component 300 is similar to the passive component 100, 200 in FIGS. 2 and 3, except the transmission lines all have the same width. Thus, the transmission line arrangement is therefore rotationally symmetric about each of axes A, B, C and D (in FIGS. 2 and 3). The LNA 302 is an active component and so the LNA 302 (and any other active circuitry of the amplifier 350) is provided below the ground shield 320 of the passive component 300, in at least one further layer 325 as shown in FIG. 8B. In this embodiment, the transmission line arrangement in passive component 300 forms a bypass path for the amplifier 350 and allows the surface area required by the amplifier 350 to be significantly reduced.

Some additional non-limiting uses of the passive component of the present disclosure are in an IQ modulator, a polyphase filter, or a Reflective Type Phase Shifter. Preferably, a ground shield and at least one intermediate layer are provided to separate and isolate any active circuitry from the transmission line arrangement.

Figure 9:
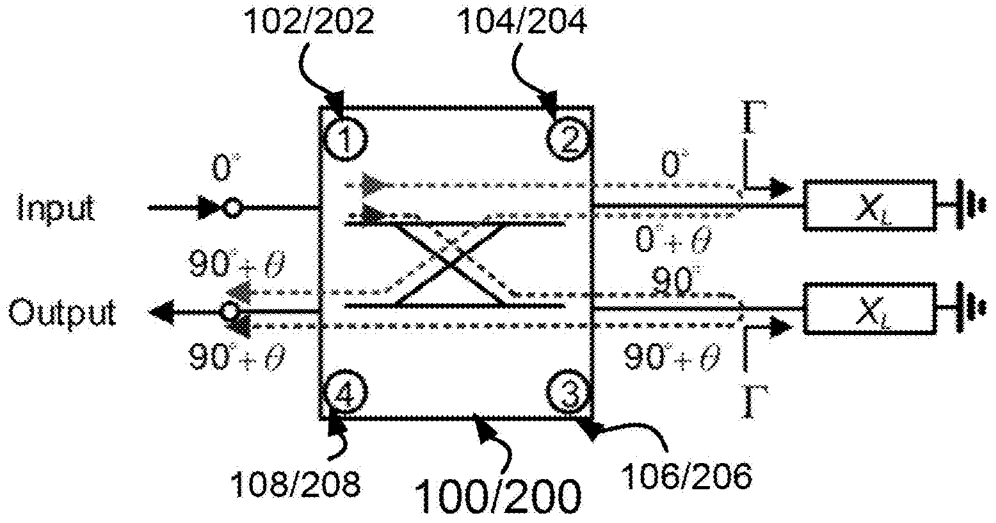
FIG. 9 shows an embodiment of a Reflective Type Phase Shifter (RTPS).

FIG. 9 shows an example of the passive component 100, 200 in use as a hybrid quadrature coupler, wherein (1) is the input port 102, 202, (2) is the through port 104, 204, (3) is the couple port 106, 206 and (4) is the isolated port 108, 208. In order to make a RTPS (Reflective Type Phase Shifter), the coupled port 106, 206 and the through port 104, 204 are loaded by a load $X_L$ (can be varactors, coils, transformers, capacitors). If the load is an active component such as a varactor or a capacitor, the active component can be placed below the ground shield 120, 220 of the hybrid quadrature coupler 100, 200.

The passive component of the present disclosure may be used in mmWave circuits typically for K, V and W-bands and even above.

Accordingly, there has been described a more compact transmission line arrangement that does not negatively affect the performance of the transmission line arrangement.

More particularly, a passive component has been described, comprising a first port and a second port, wherein the first and second ports are provided on a first axis, a third port and a fourth port, wherein the third and fourth ports are provided on a second axis perpendicular to the first axis, and a transmission line arrangement comprising four transmission lines, wherein the first port and the second port are each coupled to both the third port and the fourth port by respective transmission lines of the transmission line arrangement, wherein each transmission line follows a meandering path and each transmission line has the same length, such that the transmission line arrangement is symmetrical about at least one axis of symmetry.

The passive component may be formed on a PCB, or in an integrated circuit.

The passive component may be combined with active circuitry to form an active component.

Although particular embodiments of this disclosure have been described, it will be appreciated that many modifications/additions and/or substitutions may be made within the scope of the claims.

The invention claimed is:

1. A passive component comprising:

a first port and a second port, wherein the first and second ports are provided on a first axis;

a third port and a fourth port, wherein the third and fourth ports are provided on a second axis perpendicular to the first axis; and a transmission line arrangement comprising four transmission lines, wherein the first port and the second port are each coupled to both the third port and the fourth port by respective transmission lines of the transmission line arrangement, wherein each transmission line follows a meandering path and each transmission line has a substantially equal physical path length, such that the transmission line arrangement is symmetrical about at least one axis of symmetry.

2. The passive component of claim 1, wherein the transmission line arrangement is symmetrical about a first axis of symmetry and a second axis of symmetry, wherein the first axis of symmetry is perpendicular to the second axis of symmetry.

3. The passive component of claim 2, wherein the first axis of symmetry and the second axis of symmetry each extend at an angle of 45 degrees relative to both the first axis and the second axis.

4. The passive component of claim 1, wherein the transmission line arrangement is symmetrical about the first axis and the second axis.

5. The passive component of claim 1, wherein the first axis and the second axis define four quadrants, and a different transmission line of the transmission line arrangement is provided within each quadrant.

6. The passive component of claim 5, wherein the transmission lines provided in nearest neighbour quadrants have different widths.

7. The passive component of claim 5, wherein each transmission line is compressed or folded within the respective quadrant.

8. The passive component of claim 1, wherein the transmission line arrangement is provided in a single plane.

9. The passive component of claim 1, wherein each transmission line has a length that is at least two times greater than a length of a direct path between the respective ports.

10. The passive component of claim 1, wherein:

the transmission line arrangement is provided on a top layer;

a ground shield is provided as a bottom layer; and at least one intermediate layer is provided between the top layer and the bottom layer.

11. The passive component of claim 10, wherein the at least one intermediate layer comprises one or more ground paths coupled to the ground shield.

12. The passive component of claim 1, wherein the passive component is a hybrid coupler, wherein:

the first port is input port, the second port is a first output port, the third port is a second output port and the fourth port is an isolated port.

13. The passive component of claim 1, wherein the meandering path comprises at least two changes of direction, or at least two turning points.

14. An amplifier comprising:

a passive component with a first port and a second port, wherein the first and second ports are provided on a first axis, a third port and a fourth port, wherein the third and fourth ports are provided on a second axis perpendicular to the first axis, and a transmission line arrangement comprising four transmission lines that form a bypass path, wherein the first port and the second port are each coupled to both the third port and the fourth port by respective transmission lines of the transmission line arrangement, wherein each transmission line follows a meandering path and each transmission line has a substantially equal physical path length, such that the transmission line arrangement is symmetrical about at least one axis of symmetry;

a ground shield provided as a bottom layer; and at least one active component below the ground shield.

15. The amplifier of claim 14, wherein the transmission line arrangement is symmetrical about a first axis of symmetry and a second axis of symmetry, wherein the first axis of symmetry is perpendicular to the second axis of symmetry.

16. The amplifier of claim 14, wherein the first axis and the second axis define four quadrants, and a different transmission line of the transmission line arrangement is provided within each quadrant.

17. A method of manufacturing a passive component, comprising:

providing a substrate;

forming a first port and a second port on the substrate, wherein the first and second ports are provided on a first axis;

forming a third port and a fourth port on the substrate, wherein the third and fourth ports are provided on a second axis perpendicular to the first axis; and forming a transmission line arrangement on the substrate, the transmission line arrangement comprising four transmission lines, wherein the first port and the second port are each coupled to both the third port and the fourth port by respective transmission lines of the transmission line arrangement, and wherein each transmission line follows a meandering path and each transmission line has a substantially equal physical path length, such that the transmission line arrangement is symmetrical about at least one axis of symmetry.

18. The method of claim 17, further comprising:

providing a ground shield as a bottom layer of the passive component; and providing at least one intermediate layer on top of the ground shield, wherein the transmission line arrangement is provided on a top layer.

19. The method of claim 17, wherein:

the transmission line arrangement is symmetrical about a first axis of symmetry and a second axis of symmetry, and the first and second axes of symmetry are perpendicular.

20. The method of claim 17, wherein:

the first axis and the second axis define four quadrants, and a different transmission line of the transmission line arrangement is provided within each quadrant.

* * * * *